US008050885B2

(12) United States Patent
Lapierre

(10) Patent No.: US 8,050,885 B2
(45) Date of Patent: Nov. 1, 2011

(54) METHOD FOR DETERMINING THE EFFECTS OF THE WIND ON A BLIND

(75) Inventor: Stéphane Lapierre, Sallanches (FR)

(73) Assignee: Somfy SAS, Cluses (FR)

( * ) Notice: Subject to any disclaimer, the term of this patent is extended or adjusted under 35 U.S.C. 154(b) by 741 days.

(21) Appl. No.: 11/970,853

(22) Filed: Jan. 8, 2008

(65) Prior Publication Data

US 2008/0163685 A1 Jul. 10, 2008

(30) Foreign Application Priority Data

Jan. 10, 2007 (FR) ...................................... 07 00155

(51) Int. Cl.
*G01P 13/04* (2006.01)
*G01P 15/14* (2006.01)
*G06F 3/00* (2006.01)
*G06F 12/06* (2006.01)

(52) U.S. Cl. ......... 702/141; 702/127; 702/129; 702/147

(58) Field of Classification Search .................... 702/41, 702/128, 141, 143, 149, 153, 173; 73/736; 318/483; 345/156; 454/188
See application file for complete search history.

(56) References Cited

U.S. PATENT DOCUMENTS 3,956,932 A * 5/1976 Fletcher et al. ............ 73/170.12
4,480,480 A * 11/1984 Scott et al. ...................... 73/769
4,615,214 A 10/1986 Burns
5,225,748 A * 7/1993 Haring .......................... 318/266
6,375,562 B1 * 4/2002 Hein ............................ 454/188
6,661,403 B1 * 12/2003 Rosenberg et al. ........... 345/156
6,732,018 B2 * 5/2004 Osinga .......................... 700/275
7,328,624 B2 * 2/2008 Gysling et al. .................. 73/736
7,342,375 B2 * 3/2008 Johansen ...................... 318/483
2006/0113936 A1 6/2006 Goth

FOREIGN PATENT DOCUMENTS

DE 198 40 418 A 3/2000
EP 1 077 378 A 2/2001
EP 1 077 378 B 4/2006

* cited by examiner

*Primary Examiner* — Eliseo Ramos Feliciano
*Assistant Examiner* — Felix Suarez
(74) *Attorney, Agent, or Firm* — Frommer Lawrence & Haug LLP; Ronald R Santucci

(57) ABSTRACT

A method for determining the effects of the wind on a blind (1) or the like that is provided with a sensor means (231) for measuring the effects of the wind in a first measurement direction ($X_1$) and in a second measurement direction ($Y_1$), the two directions being different, the method comprising the following steps:

collecting, from the sensor means, a first signal representative of the effects of the wind on the blind or the like, in the first measurement direction;

collecting, from the sensor means, a second signal representative of the effects of the wind on the blind or the like, in the second measurement direction;

which comprises the step of:

processing these signals so as to provide a secondary signal representative of the effects of the wind and independent of the orientation of the sensor means in a plane defined by the two directions, in order to obtain uniform sensor detection sensitivity irrespective of the orientation of the sensor.

18 Claims, 5 Drawing Sheets

METHOD FOR DETERMINING THE EFFECTS OF THE WIND ON A BLIND

This application claims priority benefits from French Patent Application No. FR 07 00155 filed Jan. 10, 2007, the disclosure of which is hereby incorporated by reference.

The invention relates to a method for determining the effects of the wind on a blind or the like and to a device for protecting a blind or the like against the effects of the wind.

BACKGROUND OF THE INVENTION

Manufacturers seek to protect blinds against the effects of the wind. Indeed, when the wind blows in gusts, the fabric of the blind offers great resistance to the wind and places extreme stresses on the structure of the blind. The blind may thus be damaged. It should be noted that damage to the blind is greater when a force is applied substantially perpendicularly to the surface of the deployed fabric. Furthermore, from a safety standpoint, it is essential for the blind to remain securely fastened to the structure of the building to which it is fitted. Standard EN13561 specifies, further, the constraints to be complied with.

In response to this requirement, a known solution consists in measuring the vibration of the movable components, i.e. the arms or, more commonly, the load bar. As soon as the measured vibration exceeds a certain threshold, which is set by the installer, a command for retraction is transmitted to the actuator controlling the blind. The actuator then causes the fabric to be rolled up around the roll tube and for the arms to be retracted.

DESCRIPTION OF THE PRIOR ART

Vibration is generally measured in terms of the acceleration of the movable component in one direction. Thus, application US 2006/0113936 discloses a piezoelectric-type unidirectional vibration sensor. A sensor of this type will thus have preferential detection sensitivity. Thus, the orientation of the sensor has an impact on the system's detection sensitivity. Consequently, if the detection direction is parallel to the surface of the deployed fabric a force on the structure, generated by the wind, in a perpendicular direction will be scarcely if at all detected, whereas damage may still be caused to the blind. In order to obviate this problem, a low detection threshold may be defined. In such a case, when the structure is stressed in accordance with the sensor's detection direction, the sensor is likely to cause the fabric to be unnecessarily retracted.

Document DE 198 40 418 discloses a special blind structure in which a screen is guided in a circular manner. The blind structure is provided with a sensor for determining the actions of the wind on the screen. The sensor comprises a means for measuring accelerations in a tangential direction and in a radial direction. The signals obtained are subsequently processed by filtering.

U.S. Pat. No. 3,956,932 discloses a sensor for determining wind direction. It comprises components that are heated by a heating means on the one hand and cooled by the wind on the other. By determining their temperatures, it is possible to ascertain which components are most exposed to the wind and thus the wind direction.

U.S. Pat. No. 4,615,214 discloses an anemometer with piezoelectric components. It comprises a plurality of piezoelectric components in a spatial arrangement. As a function of the output signals from said components, it is possible to ascertain which are the most exposed to the wind and thus the wind direction.

Lastly, document EP 1 077 378 discloses a blind that comprises a sensor for determining wind conditions. Different usable sensor technologies are listed.

SUMMARY OF THE INVENTION

An object of the invention is to provide a method for determining the effects of the wind, obviating the abovementioned drawbacks and improving the methods known from the prior art. In particular, the invention proposes a method for determining the effects of the wind that makes it possible to eliminate the installation constraints on a sensor, particularly constraints concerning the orientation of the sensor, and to obtain uniform sensor detection sensitivity irrespective of the orientation of the sensor. The invention also relates to a detection device designed to be secured to a blind or the like in order to determine the effects of the wind on the latter.

In a first embodiment, the determination method according to the invention is a method for determining the effects of the wind on a blind that is provided with a sensor means for measuring the effects of the wind on the blind in a first measurement direction ($X_1$) and the effects of the wind on the blind in a second measurement direction ($Y_1$), the two directions being different, the method comprising the following steps:

- collecting, from the sensor means, a first signal representative of the effects of the wind on the blind, in the first measurement direction; and
- collecting, from the sensor means, a second signal representative of the effects of the wind on the blind, in the second measurement direction;
- processing these signals so as to provide a secondary signal representative of the effects of the wind and independent of the orientation of the sensor means in a plane defined by the two directions, in order to obtain uniform sensor detection sensitivity irrespective of the orientation of the sensor,
- wherein the sensor means comrpises at least one accelerometer.

A different variant embodiment is the determination method which further comprises a preliminary step of positioning the sensor means, the orientation of the sensor means being unimportant provided the first and second measurement directions are parallel to a plane chosen for measuring the effects of the wind.

A different variant embodiment is the method wherein the secondary signal is the intensity of the resultant of the signals representative of the effects of the wind over the various directions or the intensity and the direction of the resultant of the signals representative of the effects of the wind over various directions.

A different variant embodiment is the method which comprises a preliminary step of determining axes (X, Y) specific to the blind, and wherein the secondary signal consists of components of the resultant of the signals representative of the effects of the wind along these specific axes. A different variant embodiment is determination method wherein the preliminary determination step comprises a sub-step in which a mechanical action is exerted on the blind, a sub-step in which the sensor means determines the direction of this action and a sub-step in which this direction is used in order to define one of the axes specific to the blind.

The detection device according to the invention is a detection device designed to be secured onto a blind, comprising a sensor means measuring the effects of the wind on the blind in at least a first measurement direction ($X_1$) and the effects of the wind on the blind in a second measurement direction ($Y_1$), the two directions being different, which comprises the sensor means and a computer device including at least one computer readable medium storing software thereon which when executed by the at least one computer causes the at least one computer to at least:

- collect, from the sensor means, a first signal representative of the effects of the wind on the blind, in the first measurment direction;
- collect, from the sensor means, a second signal representative of the effects of the wind on the blind, in the second measurement direction; and
- process these signals so as to provide a secondary signal representative of the effects of the wind and independent of the orientation of the sensor means in a plane defined by the two directions, in order to obtain uniform sensor detection sensitivity irrespective of the orientation of the sensor,
- wherein the sensor means comprises at least one accelerometer.

According to the invention, the device for protecting a blind or the like is a device for protecting a blind, which comprises a detection device designed to be secured onto the blind, comprising a sensor means measuring the effects of the wind on the blind in at least a first measurement direction ($X_1$) and the effects of the wind on the blind in a second measurement direction ($Y_1$), the two directions being different, which comprises the sensor means and a computer device including at least one computer readable medium storing software thereon for implementing the method as claimed in claim 1 which when executed by the at least one computer causes the at least one computer to at least:

- collect, from the sensor means, a first signal representative of the effects of the wind on the blind, in the first measurement direction;
- collect, from the sensor means, a second signal representative of the effects of the wind on the blind, in the second measurement direction; and process these signals so as to provide a secondary signal representative of the effects of the wind and independent of the orientation of the sensor means in a planedefined by the two directions, in order to obtain uniform sensor detection sensitivity irrespective of the orientation of the sensor,
wherein the sensor means comprises at least one accelerometer.

An embodiment is the protection device, wherein the signals are processed in the detection device or in an electronic control unit.

An embodiment is the device which comprises means for issuing a command for the blind to be retracted when the secondary signal or one of the components of the secondary signal exceeds a predetermined threshold.

In a second embodiment, the determination method according to the invention is method for determining the effects of the wind on a blind provided with a sensor means, the sensor means comprising at least one accelerometer, for measuring the effects of the wind on the blind in a first measurement direction, and the effects of wind on the blind in a second measurement direction and in a third measurement direction, the three directions being different from one another, the method comprising the following steps:

- collecting, from the sensor means, a first signal representative of the effects of the wind on the blind, in a first measurement direction;
- collecting, from the sensor means, a second signal representative of the effects of the wind on the blind, in a second measurement direction;
- collecting, from the sensor means, a third signal representative of the effects of the wind on the blind, in a third measurement direction; and
- processing these signals so as to provide a secondary signal representative of the effects of the wind and independent of the orientation of the sensor means, in order to obtain uniform sensor detection sensitivity irrespective of the orientation of the sensor.

A different variant embodiment is the determination method, which comprises a preliminary step of positioning the sensor means, the orientation of the sensor means in space being unimportant.

A different variant embodiment is the determination method, wherein the secondary signal is the intensity of the resultant of the signals representative of the effects of the wind over the various directions or the intensity and the direction of the resultant of the signals representative of the effects of the wind over various directions.

A different variant embodiment is the determination method, which comprises a preliminary step of determining axes (X, Y) specific to the blind, and wherein the secondary signal consists of components of the resultant of the signals representative of the effects of the wind along these specific axes.

A different variant embodiment is the determination method, wherein the preliminary determination step comprises a sub-step in which a mechanical action is exerted on the blind, a sub-step in which the sensor means determines the direction of this action and a sub-step in which this direction is used in order to define one of the axes specific to the blind.

The detection device according to the invention is a detection device designed to be secured onto a blind, comprising a sensor means measuring the effects of the wind on the blind in at least a first measurement direction ($X_1$) and the effects of wind on the blind in a second measurement direction ($Y_1$), the two directions being different, which comprises the sensor means and a computer, device including at least one computer readable medium storing software which when executed by the at least one computer causes the at least one computer to at least:

- collect, from the sensor means, a first signal representative of the effects of the wind on the blind, in a first measurement duration;
- collect, from the sensor means, a second signal representative of the effects of the wind on the blind, in a second measurement direction;
- collect, from the sensor means, a third signal representative of the effects of the wind on the blind, in a third measurement direction; and
- processing these signals so as to provide a secondary signal representative of the effects of the wind and independent of the orientation of the sensor means, in order to obtain uniform sensor detection sensitivity irrespective of the orientation of the sensor,
- wherein the sensor means comprises at least one accelerometer.

According to the invention, the device for protecting a blind or the like is a device for protecting a blind, which comprises a detection device designed to be secured onto a blind, comprising a sensor means measuring the effects of the wind on the blind in at least a first measurement direction ($X_1$) and the effects of wind on the blind in a second measurement direction ($Y_1$), the two directions being different, which comprises the sensor means and a computer device including at least one computer readable medium storing software which when executed by the at least one computer causes the at least one computer to at least: for implementing the method as claimed in claim 11 collect, from the sensor means, a first signal representative of the effects of the wind on the blind, in a first measurement direction;

collect, from the sensor means, a second signal representative of the effects of the wind on the blind, in a second measurement direction;

collect, from the sensor means, a third signal representative of the effects of the wind on the blind, in a third measurement direction; and processing these signals so as to provide a secondary signal representative of the effects of the wind and independent of the orientation of the sensor means, in order to obtain uniform sensor detection sensitivity irrespective of the orientation of the sensor.

An embodiment is the protection device, wherein the signals are processed in the detection device or in an electronic control unit.

An embodiment is the protection device, which comprises means for issuing a command for the blind to be retracted when the secondary signal or one of the components of the secondary signal exceeds a predetermined threshold.

DESCRIPTION OF THE DRAWINGS

The invention will be better understood upon reading the following description, which is given solely by way of example and is made with reference to the appended drawings, in which.

DESCRIPTION OF THE PREFERRED EMBODIMENTS

Figure 1:
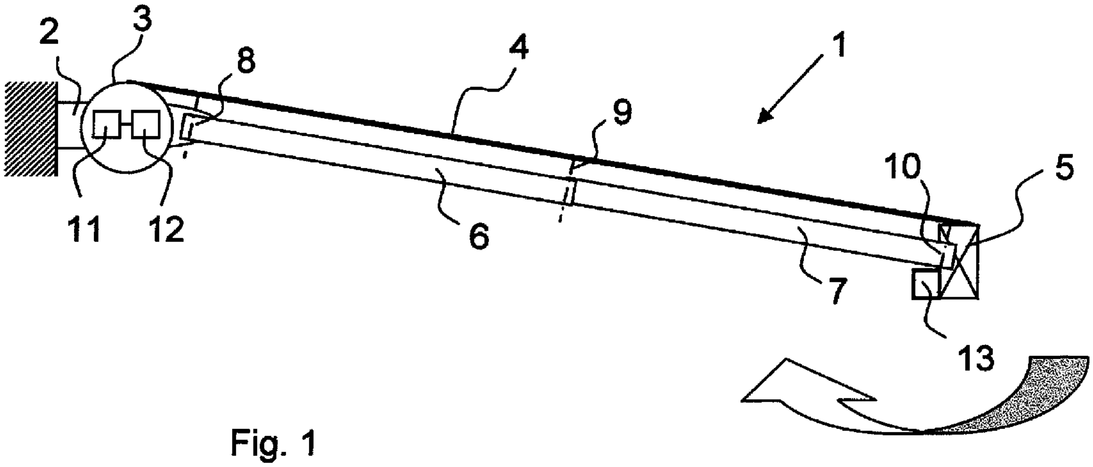
FIG. 1 is a diagram of a blind with arms, incorporating an embodiment of a protection device according to the invention.

The blind 1 with arm, shown in FIG. 1, comprises a support 2 mounted on the structure of a building, a roll tube 3 driven by a motor 11, onto which a fabric 4 is wound, and a load bar 5 connected to the support 2 by means of articulated arms.

The articulated arms comprise two segments 6, 7, the first segment being articulated at one of its ends to the support 2 about a first axis 8 and at the other of its ends to one of the ends of the second segment 7 about a second axis 9. The other end of the second segment 7 is articulated to the load bar 5 about a third axis 10.

The fabric 4 is fastened on the one hand to the roll tube 3 and on the other to the load bar 5 such that it may be rolled up onto the roll tube 3 or unrolled from the tube 3 by actuating means, such as, for example, a motor 11 whose power supply is controlled by an electronic control unit 12. In FIG. 1, the fabric is shown in an unrolled state.

A detection device 13 is arranged on the load bar 5 in order to determine the effect of the wind on the structure. When the magnitude measured exceeds a threshold value, the detection device transmits a command, by radio, to the electronic control unit 12, for the fabric 4 to be retracted.

Figure 2:
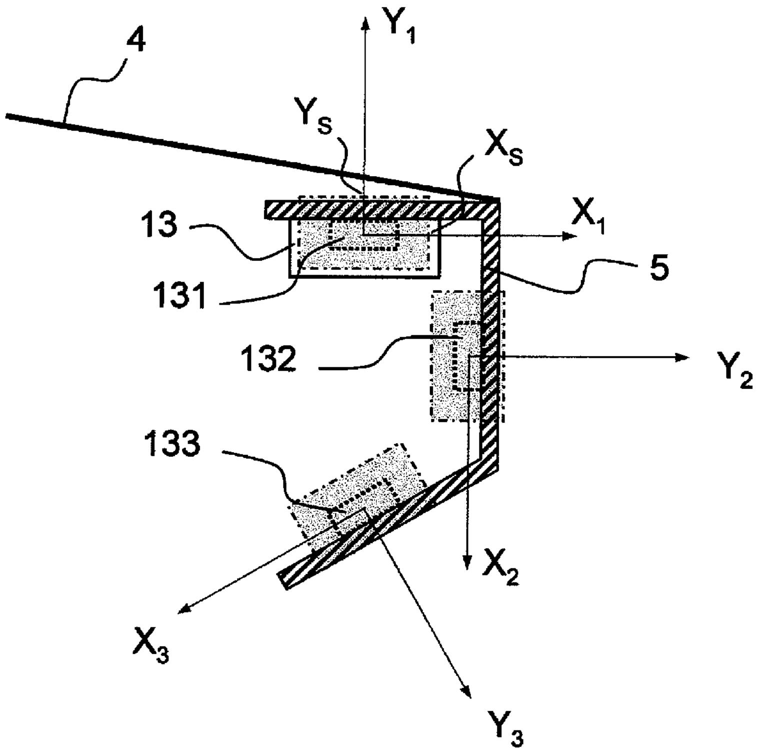
FIG. 2 describes the detection principle of detection devices representative of the prior art, a cross section of a blind in a plane P being shown.

There are various ways in which to determine the effect of the wind. For example, use may be made of sensor means provided with one or more accelerometers. FIG. 2 illustrates the use of a sensor means of this type, which detects acceleration in two perpendicular directions $X_1$ and $Y_1$, $X_2$ and $Y_2$ or $X_3$ and $Y_3$. This figure shows three examples of how the sensor means is secured to the load bar 5: 131, horizontal; 132, vertical; and 133, at 45°. In the first example, the sensor means 131 detects or measures accelerations along the axes $X_1$ and $Y_1$. Threshold values Xs and Ys have been predefined for each detection axis. As long as the accelerations do not exceed the above thresholds, i.e. for as long as the result of the measurements is within the grey zone, no signal is transmitted to the electronic control unit 12. However, as soon as a threshold value is exceeded, a command for the fabric to be retracted is transmitted to the electronic control unit 12. The principle is the same in the other examples of how the sensor means is secured. The sensor means 132 detects or measures accelerations along the axes $X_2$ and $Y_2$. The sensor means 133 detects or measures accelerations along the axes $X_3$ and $Y_3$. In this illustration, the threshold values Xs and Ys are the same for all the sensor means 131, 132 and 133. As the directions $X_1$, $Y_1$, $X_2$, $Y_2$, $X_3$ and $Y_3$ are intrinsic to the structure of the sensor means, it will be noted that the detection or measurement sensitivity of the sensor means is dependent upon its orientation on the load bar. Even if it were possible to obtain the same sensitivity for the sensor 131 and 132 by inverting the threshold values, it is not, however, possible to obtain the same sensitivity in the case of the sensor 133 given its orientation. It is thus not possible to have a system provided with such a sensor means operating independently of the orientation of said sensor means.

Figure 9:
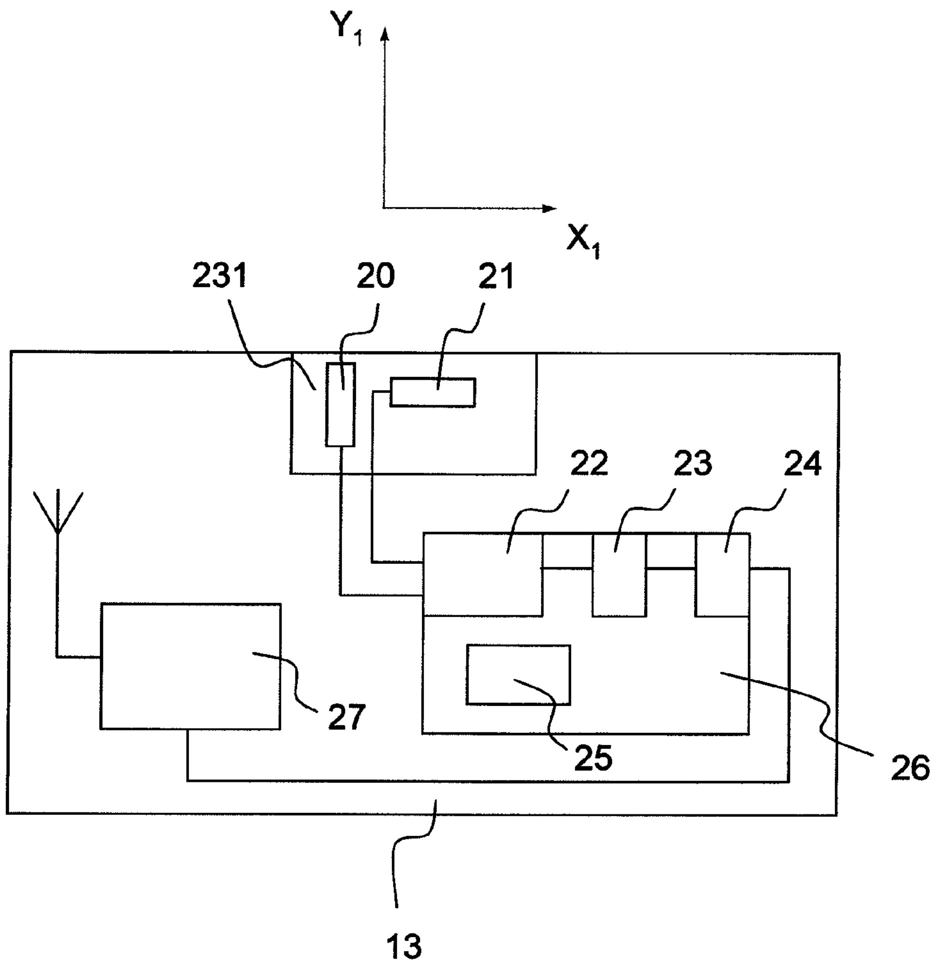
FIG. 9 is an embodiment of a detection device according to the invention.

The detection device 13, shown in FIG. 9, comprises principally a sensor means 231, a logic processing unit 26 and a radioelectric wave transmitter 27.

The sensor means 231 comprises two accelerometers 20 and 21. The first accelerometer 20 is designed to detect and to measure accelerations along the axis $Y_1$, and the second accelerometer 21 is designed to detect and to measure accelerations along the axis X1. The axes X1 and Y1 are perpendicular. These two accelerometers provide signals to the logic processing unit 26.

The logic processing unit 26 comprises a means 22 for processing the signals provided by the sensor means 231. It makes it possible to provide a means 23 for comparing a secondary signal designed to be compared with one or more thresholds stored in a memory 25. This comparison means makes it possible to provide a signal triggering the establishment of a control signal within a means for generating a control signal 24. This control signal is then transmitted to the radioelectric wave transmitter 27, which transmits it in radioelectric form. The detection device comprises, in particular, logic means for controlling the determination method that is the subject of the invention, embodiments of which are described in detail below. In particular, these logic means may comprise computer programs that can, in particular, be implemented in the logic processing unit. The means 22 for processing the signals provided by the sensor means 231 may also comprise software means, like computer programs for calculating the secondary signal.

Figure 4:
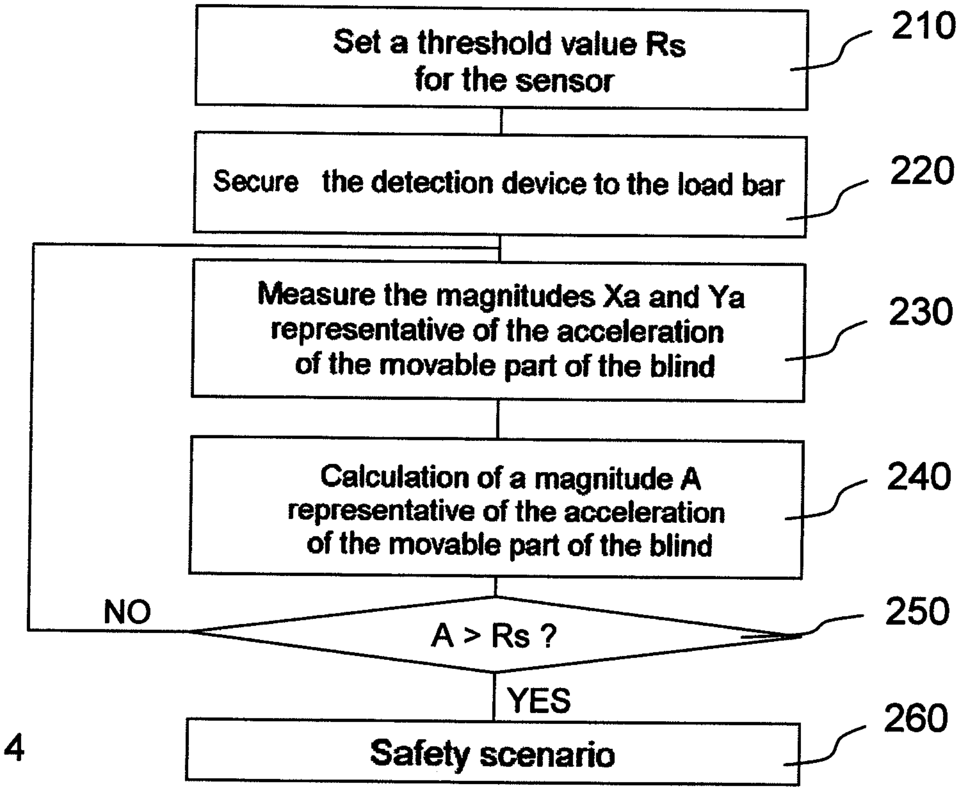

A first embodiment of the determination method according to the invention is described below with reference to FIG. 4.

In a first step 210, a threshold value Rs is set in the detection device 13. It may be set by means of a potentiometer or by any other similar means. The threshold value is stored in the memory 25.

Figure 3:
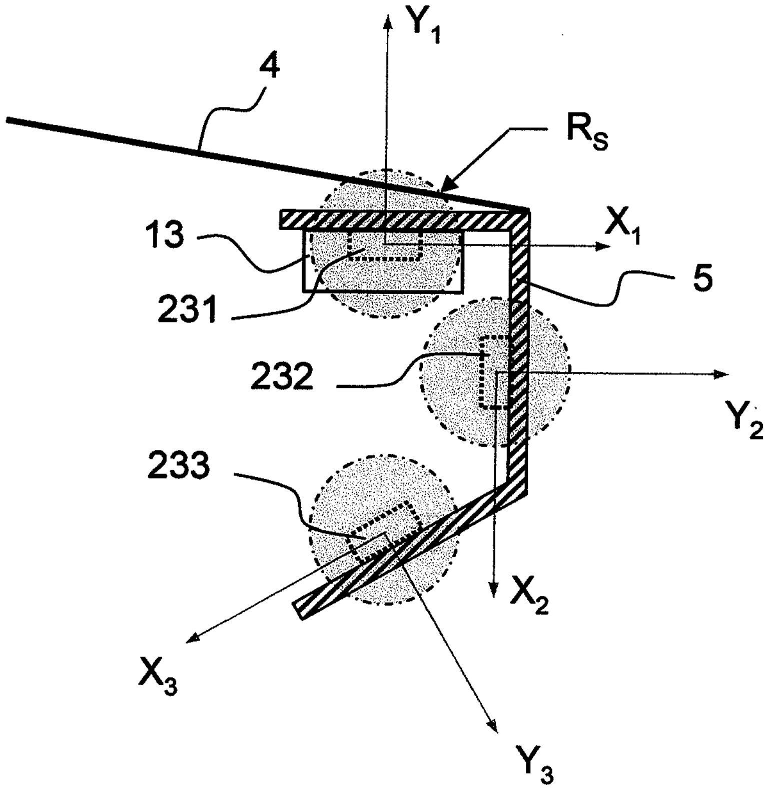
FIGS. 3, 4 and 5 describe the detection principle of a detection device implementing a first embodiment of the determination method according to the invention on the basis of schematic diagrams and a flowchart.

In a second step 220, the detection device is secured to the load bar. The order of this step and the preceding step may be reversed, but it is simpler to carry out the operations in the order suggested. Securing of the detection device is, for example, such that the sensor means it contains is in one of the positions of FIG. 3, i.e. the axes $X_1$, $Y_1$ and/or $X_2$, $Y_2$ and/or $X_3$, $Y_3$ of the sensor means 231 and/or 232 and/or 233 are parallel to (or at least substantially parallel to) one and the same plane P in which it is desired to measure the effects of the wind. In the case of FIG. 3, this plane P is perpendicular to the load bar 5. However, it is unimportant how the sensor means is oriented in this plane P (about the axis of the load bar), as shown by the various positions of the sensors 231, 232 and 233. In other words, the sensor means may be oriented angularly relative to an axis perpendicular to the two measurement directions of the sensor means without affecting the determination of the secondary signal representative of the effects of the wind. This signal is thus independent of the orientation of the sensor in the plane P, i.e. independent of its orientation relative to said perpendicular axis. Therefore, the sensor may be secured freely on a component of the blind provided its measurement directions always remain in the same plane. In the remainder of the text it is assumed that the detection device comprises the sensor means 231.

In a third step 230, the sensor means 231 provides signals representative of the accelerations experienced by the movable part of the blind to which the sensor is secured, in this case the load bar. These signals are, in this case, representative of the projections of the accelerations experienced by the load bar onto the detection axes of the accelerometers of which the sensor means is composed, namely $X_1$ and $Y_1$. The instantaneous values of the signals obtained are denoted Xa and Ya, respectively.

In a fourth step 240, the instantaneous value of a signal representative of the acceleration experienced by the detection device or the load bar is calculated on the basis of the instantaneous values of the signals representative of the projections of said acceleration. The vector representing said resultant acceleration is denoted A, its instantaneous value nA (the norm of the vector) being:

$$nA=\sqrt{Xa^2+Ya^2}$$

The instantaneous value of the resultant acceleration constitutes a secondary signal representative of the effects of the wind and independent of the orientation of the sensor means in the plane P.

In a fifth step 250, the instantaneous value of the acceleration is compared to the threshold value Rs. If this instantaneous value is greater than the threshold value Rs, the method then goes to a sixth step 260. If not, it returns to step 230. A delay may be arranged before step 230 is repeated.

In the sixth step 260, a safety scenario execution command is transmitted by the detection device to the electronic control unit 12, and then said command is executed. Generally, the scenario begins with a command to retract the fabric.

Figure 5:
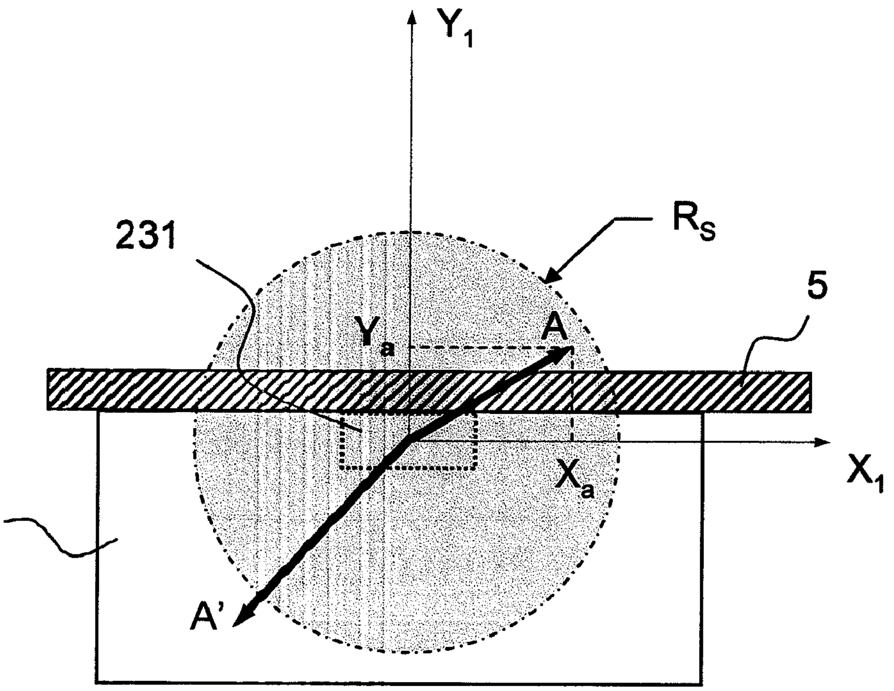

FIG. 5 illustrates this principle of processing the measurements of the sensor means. The acceleration vector A does not trigger any scenario, whereas the acceleration vector A' commands rolling up of the fabric 4, the end of the arrow representing the vector A' emerging from the gray zone.

Returning to FIG. 3, it now appears that, irrespective of the orientation of the sensor means, the detection sensitivity is always the same. The detection device triggers the safety scenario for one and the same stress.

Figure 7:
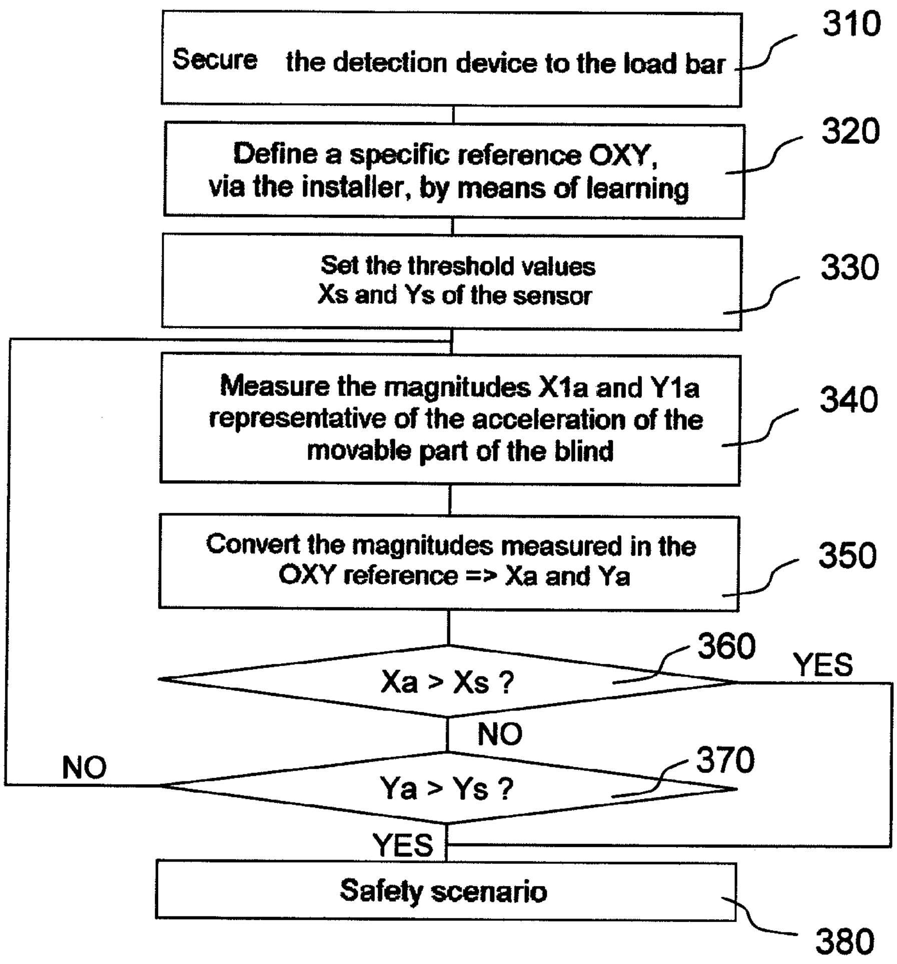

A second embodiment of the determination method according to the invention is described below with reference to FIG. 7.

In a first step 310, the detection device is secured to the load bar, as described for step 220. The configuration of the detection device is identical to that of FIG. 3. However, a learning phase is necessary here.

In a second step 320, the installer performs a configuration operation that makes it possible to associate a specific OXY reference, for example an orthogonal reference, with the sensor means. Setting of this new OXY reference is thus independent of the detection axes $X_1$ and $Y_1$ of the sensor means. It is thus independent of the orientation of the detection device. The fact that this reference is taken into account by the detection device is reflected in a relationship between the new OXY reference and a reference $OX_1Y_1$ corresponding to the detection axes of the sensor (rotation through an angle $\alpha$).

In order to define this specific reference, different learning methods may be envisaged. The detection device may detect the vertical by using the effect of gravity detected by measurement using its accelerometers 20, 21 (the load bar being, for example, deployed and at rest). On the basis of these measurements, the detection device is able to define an absolute orientation and to deduce a specific reference that is identical irrespective of the orientation of the detection device. The axis X of the specific reference may be parallel to the gravity field.

Another means consists in placing the detection device in a configuration mode. The installer then stresses the load bar by exerting a force on it. The stress axis is determined by analysis of the signals supplied by the accelerometers 20 and 21 of the sensor means. This stress axis can then constitute the axis X of the specific reference.

A third means may comprise learning of the specific reference during deployment of the fabric or a to-and-fro movement of the fabric in the wake of a specific command. The axis X would correspond to the deployment axis. Other means may be used, particularly by means of the installer inputting orientation angles of the detection device relative to the vertical via a man/machine interface.

In a third step 330, threshold values Xs and Ys are set. These values are stored in the memory 25. These values Xs and Ys correspond, respectively, to thresholds that are not to be exceeded, according to each axis X and Y of the set specific reference OXY. Setting may be performed using potentiometers or any other means. Alternately, a threshold value may be applied to a plurality of axes, thus making it possible to simplify the electronics: the setting means being not required.

In a fourth step 340, the sensor means 231 provides signals representative of accelerations experienced by the movable part of the blind onto which the detection device is secured, in this case the load bar. These signals are in this case representative of the projections of the accelerations experienced by the load bar on the detection axes of the accelerometers of which the sensor means is composed, namely $X_1$ and $Y_1$. The instantaneous values of the signals obtained are denoted $X_1a$ and $Y_1a$, respectively. As previously, measurement is directly based on the accelerometers of which the sensor means is composed.

In a fifth step 350, the measurements $X_1a$ and $Y_1a$ obtained previously are converted into the predefined specific reference OXY by rotation transformation, giving the magnitudes Xa and Ya. They are expressed as follows:

$$Xa = X_1a \times \cos(\alpha) + Y_1a \times \sin(\alpha)$$

$$Ya = -X_1a \times \sin(\alpha) + Y_1a \times \cos(\alpha)$$

with $\alpha$ being an algebraic angle between X and $X_1$.

These magnitudes constitute a secondary signal representative of the effects of the wind and independent of the orientation of the sensor means in the plane P.

Alternately, the threshold values Xs and Ys may be transcribed into the direct measurement reference (OX1Y1). In such a case, the threshold values expressed in the direct reference are not constant. They are interdependent.

Advantageously, the detection device may be set so as to have higher sensitivity by determining a specific reference adapted to the blind. One of its axes may correspond to the most restrictive stress axis for the structure of the blind, which may be the direction perpendicular to deployment of the fabric. For said axis, a threshold value may thus be lower.

In a sixth step 360, the component Xa is compared to the threshold value Xs. If this value Xa is greater than the threshold Xs, the method goes to a step 380. If not, the method moves to a step 370.

In a seventh step 370, the component Ya is compared to the threshold value Ys. If this value Ya is greater than the threshold value Ys, progression is to the step 380. If not, there is a return to the step 340. A delay may be implemented before step 340 is repeated. Naturally, the order of the steps 360 and 370 may be reversed.

In the eighth step 380, a safety scenario execution command is transmitted by the detection device to the electronic control unit 12 and then said command is executed. Generally, the scenario begins with a command for the fabric to be retracted.

Figure 8:
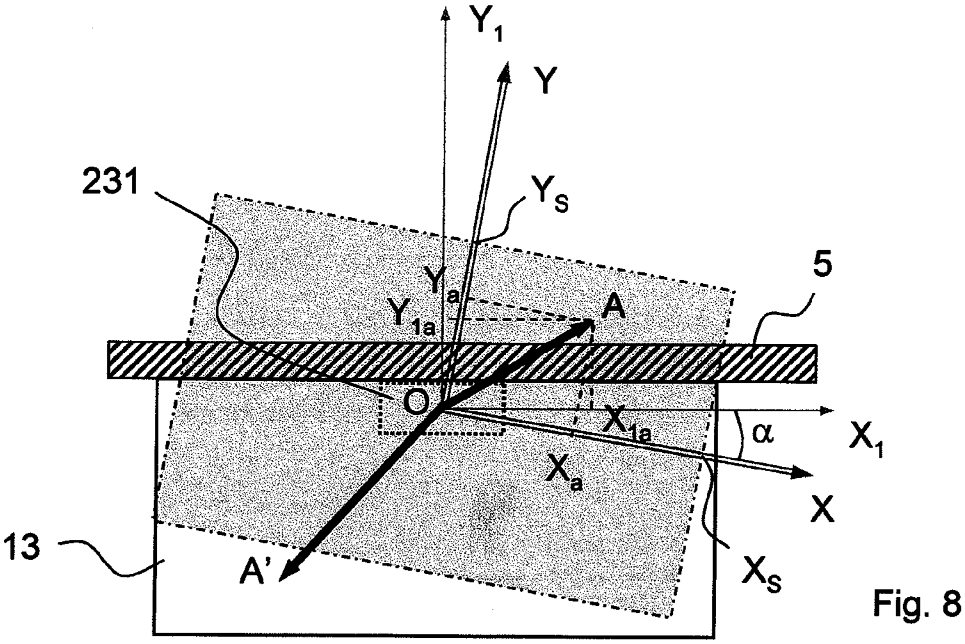

FIG. 8 illustrates this principle of processing the measurements of the sensor means. The acceleration vector A does not trigger any scenario, whereas the acceleration vector A' commands rolling up of the fabric 4, the end of the arrow representing the vector A' emerging from the gray zone.

Returning to FIG. 6, it now appears that, irrespective of the orientation of the sensor means, detection sensitivity is always the same. The detection device triggers the safety scenario for one and the same stress. Indeed, the method makes it possible to provide a secondary signal representative of the effects of the wind and independent of the orientation of the sensor means in the plane P. This secondary signal may, in particular, be the intensity of the resultant of the acceleration measured in the plane P or the intensity and the direction of the resultant of the acceleration measured in the plane P or the components, in a particular reference, of the resultant measured in the plane P.

Irrespective of the embodiment chosen, it is preferable to confirm the measurement on the basis of a mean of several measurements. This makes it possible to avoid spurious measurements. In order to execute the safety scenario, the detection device is based on a magnitude representative of the acceleration of the movable part, which may be its absolute acceleration, its acceleration variation, its speed or its variation, its position or its variation, or any other information capable of reflecting the effect of the wind on the fabric. The detection device will preferably have a autonomous power source and will preferably transmit safety commands to an electronic control unit 12 by radio. The signals and magnitudes provided by the sensor means, as described previously, are processed in the detection device, but may just as easily be processed in the electronic control unit 12. Lastly, it is advantageous to use a sensor means that detects acceleration in three axes, for example orthogonal axes. In this way, protection of the blind is enhanced. The above functioning principle then applies in the same way.

The use of a sensor that detects acceleration along three axes is more advantageous than a sensor using only two measurement directions, because the secondary signal is identical irrespective of the orientation of the sensor and there is no need to place the sensor in such a manner as to preserve the measurement directions in one and the same plane. Thus, the secondary signal is independent of the spatial orientation of the sensor and securing the sensor to a component of the blind is then all the easier.

Figure 6:
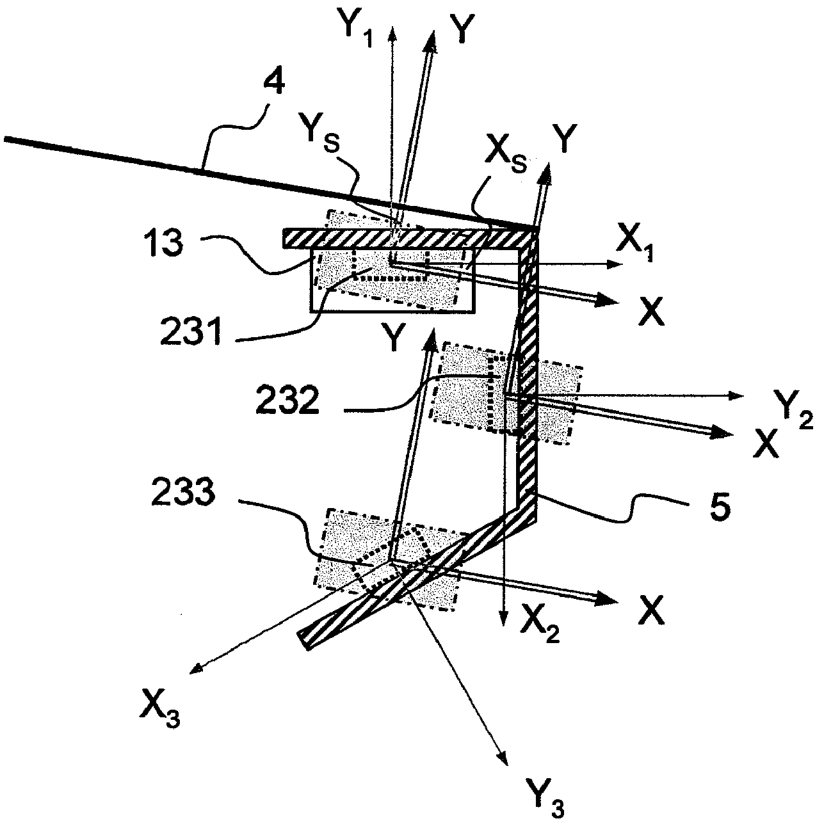
FIGS. 6, 7 and 8 describe the detection principle of a detection device implementing a second embodiment of the detection method according to the invention on the basis of schematic diagrams and a flowchart.

In this application, "plane chosen for the measurement of the effects of the wind" is understood to mean, when a sensor with two measurement directions is used, the plane in which the user wishes to measure the effects of the wind. In order to measure the effects of the wind in such a plane, it is then necessary for the measurement directions of the sensor to be parallel or coplanar with said plane. In FIGS. 3 and 6, the plane is perpendicular to the load bar and the measurement directions are coplanar.

The plane of measurement of the effects of the wind of a sensor with two measurement directions is linked to the securing of the sensor onto a movable component of the blind experiencing the effects of the wind. Thus, for one position of the sensor, the latter measures the effect of the wind as a function of the orientation of its two measurement directions. This plane is defined by the two directions. It is either parallel or coplanar with these two directions. If the two measurement directions are coplanar, the plane formed by these two directions corresponds to the plane of measurement of the effects of the wind of the sensor. If the measurement directions are not coplanar, a plane parallel to these two directions may be defined. It corresponds to the plane of measurement of the effects of the wind of the sensor.

It is considered that sensors having parallel planes of measurements of the effects of the wind measure the effects of the wind in one and the same plane. Thus, a plurality of sensors having different measurement directions may have one and the same plane of measurement of the effects of the wind.

"Orientation of the sensor in the measurement plane" means that the sensor may adopt various positions, provided its two measurement directions are always parallel or coplanar with the plane chosen for measurement.

Consequently, when the user chooses a plane for the measurement of the effects of the wind, this plane being linked to the securing of the sensor onto a movable component of the blind, the sensor may adopt various positions in order to measure the effects of the wind in the chosen plane. The effect of the wind measured by the sensor may thus be independent of its orientation in its measurement plane.

What is claimed is:

1. A method for determining the effects of the wind on a blind that is provided with a sensor means for measuring the effects of the wind on the blind in a first measurement direction ($X_1$) and the effects of the wind on the blind in a second measurement direction ($Y_1$), the two directions being different, the method comprising the following steps:

- collecting, from the sensor means, a first signal representative of the effects of the wind on the blind, in the first measurement direction; and
- collecting, from the sensor means, a second signal representative of the effects of the wind on the blind, in the second measurement direction;
- processing these signals so as to provide a secondary signal representative of the effects of the wind and independent of the orientation of the sensor means in a plane defined by the two directions, in order to obtain uniform sensor detection sensitivity irrespective of the orientation of the sensor, wherein the sensor means comprises at least one accelerometer.

2. The determination method as claimed in claim 1, which comprises a preliminary step of positioning the sensor means, the orientation of the sensor means being unimportant provided the first and second measurement directions are parallel to a plane chosen for measuring the effects of the wind.

3. The determination method as claimed in claim 1, wherein the secondary signal is the intensity of the resultant of the signals representative of the effects of the wind over the various directions or the intensity and the direction of the resultant of the signals representative of the effects of the wind over various directions.

4. The determination method as claimed in claim 1, which comprises a preliminary step of determining axes (X, Y) specific to the blind, and wherein the secondary signal consists of components of the resultant of the signals representative of the effects of the wind along these specific axes.

5. The determination method as claimed in claim 4, wherein the preliminary determination step comprises a substep in which a mechanical action is exerted on the blind, a sub-step in which the sensor means determines the direction of this action and a sub-step in which this direction is used in order to define one of the axes specific to the blind.

6. A detection device designed to be secured onto a blind, comprising:

a sensor means measuring the effects of the wind on the blind in at least a first measurement direction ($X_1$) and the effects of wind on the blind in a second measurement direction ($Y_1$), the two directions being different, which comprises the sensor means and a computer device including at least one non-transitory computer readable medium containing instructions stored therein for causing a computer to perform at least:

collect, from the sensor means, a first signal representative of the effects of the wind on the blind, in the first measurement direction;

collect, from the sensor means, a second signal representative of the effects of the wind on the blind, in the second measurement direction; and process these signals so as to provide a secondary signal representative of the effects of the wind and independent of the orientation of the sensor means in a plane defined by the two directions, in order to obtain uniform sensor detection sensitivity irrespective of the orientation of the sensor, wherein the sensor means comprises at least one accelerometer.

7. A device for protecting a blind, which comprises:

a detection device designed to be secured onto the blind, comprising a sensor means measuring the effects of the wind on the blind in at least a first measurement direction ($X_1$) and the effects of the wind on the blind in a second measurement direction ($Y_1$), the two directions being different, which comprises the sensor means and a computer device including at least one non-transitory computer readable medium containing instructions stored therein for causing a computer to perform at least:

collect, from the sensor means, a first signal representative of the effects of the wind on the blind, in the first measurement direction;

collect, from the sensor means, a second signal representative of the effects of the wind on the blind, in the second measurement direction; and process these signals so as to provide a secondary signal representative of the effects of the wind and independent of the orientation of the sensor means in a plane defined by the two directions, in order to obtain uniform sensor detection sensitivity irrespective of the orientation of the sensor, wherein the sensor means comprises at least one accelerometer.

8. The protection device as claimed in claim 7, wherein the signals are processed in the detection device or in an electronic control unit.

9. The protection device as claimed in claim 7, which comprises means for issuing a command for the blind to be retracted when the secondary signal or one of the components of the secondary signal exceeds a predetermined threshold.

10. A method for determining the effects of the wind on a blind provided with a sensor means, the sensor means comprising at least one accelerometer, for measuring the effects of the wind on the blind in a first measurement direction, and the effects of wind on the blind in a second measurement direction and in a third measurement direction, the three directions being different from one another, the method comprising the following steps:

collecting, from the sensor means, a first signal representative of the effects of the wind on the blind, in a first measurement direction;

collecting, from the sensor means, a second signal representative of the effects of the wind on the blind, in a second measurement direction;

collecting, from the sensor means, a third signal representative of the effects of the wind on the blind, in a third measurement direction; and processing these signals so as to provide a secondary signal representative of the effects of the wind and independent of the orientation of the sensor means, in order to obtain uniform sensor detection sensitivity irrespective of the orientation of the sensor.

11. The determination method as claimed in claim 10, which comprises a preliminary step of positioning the sensor means, the orientation of the sensor means in space being unimportant.

12. The determination method as claimed in claim 10, wherein the secondary signal is the intensity of the resultant of the signals representative of the effects of the wind over the various directions or the intensity and the direction of the resultant of the signals representative of the effects of the wind over various directions.

13. The determination method as claimed in claim 10, which comprises a preliminary step of determining axes (x, Y) specific to the blind, and wherein the secondary signal consists of components of the resultant of the signals representative of the effects of the wind along these specific axes.

14. The determination method as claimed in claim 13, wherein the preliminary determination step comprises a substep in which a mechanical action is exerted on the blind, a sub-step in which the sensor means determines the direction of this action and a sub-step in which this direction is used in order to define one of the axes specific to the blind.

15. A detection device designed to be secured onto a blind, comprising:

a sensor means measuring the effects of the wind on the blind in at least a first measurement direction ($X_1$) and the effects of wind on the blind in a second measurement direction ($Y_1$), the two directions being different, which comprises the sensor means and a computer device including at least one non-transitory computer readable medium containing instructions stored therein for causing a computer to perform at least:

collect, from the sensor means, a first signal representative of the effects of the wind on the blind, in a first measurement direction;

collect, from the sensor means, a second signal representative of the effects of the wind on the blind, in a second measurement direction;

collect, from the sensor means, a third signal representative of the effects of the wind on the blind, in a third measurement direction; and processing these signals so as to provide a secondary signal representative of the effects of the wind and independent of the orientation of the sensor means, in order to obtain uniform sensor detection sensitivity irrespective of the orientation of the sensor, wherein the sensor means comprises at least one accelerometer.

16. A device for protecting a blind, which comprises:

a detection device designed to be secured onto a blind, comprising a sensor means measuring the effects of the wind on the blind in at least a first measurement direction ($X_1$) and the effects of wind on the blind in a second measurement direction ($Y_1$), the two directions being different, which comprises the sensor means and a computer device including at least one non-transitory computer readable medium containing instructions stored therein for causing a computer to perform at least:

collect, from the sensor means, a first signal representative of the effects of the wind on the blind, in a first measurement direction;

collect, from the sensor means, a second signal representative of the effects of the wind on the blind, in a second measurement direction;

collect, from the sensor means, a third signal representative of the effects of the wind on the blind, in a third measurement direction; and processing these signals so as to provide a secondary signal representative of the effects of the wind and independent of the orientation of the sensor means, in order to obtain uniform sensor detection sensitivity irrespective of the orientation of the sensor.

17. The protection device as claimed in claim 16, wherein the signals are processed in the detection device or in an electronic control unit.

18. The protection device as claimed in claim 16, which comprises means for issuing a command for the blind to be retracted when the secondary signal or one of the components of the secondary signal exceeds a predetermined threshold.

* * * * *